(No Model.)
L. M. HAWLEY.
TRAP AND SIPHON.
No. 475,396. Patented May 24, 1892.
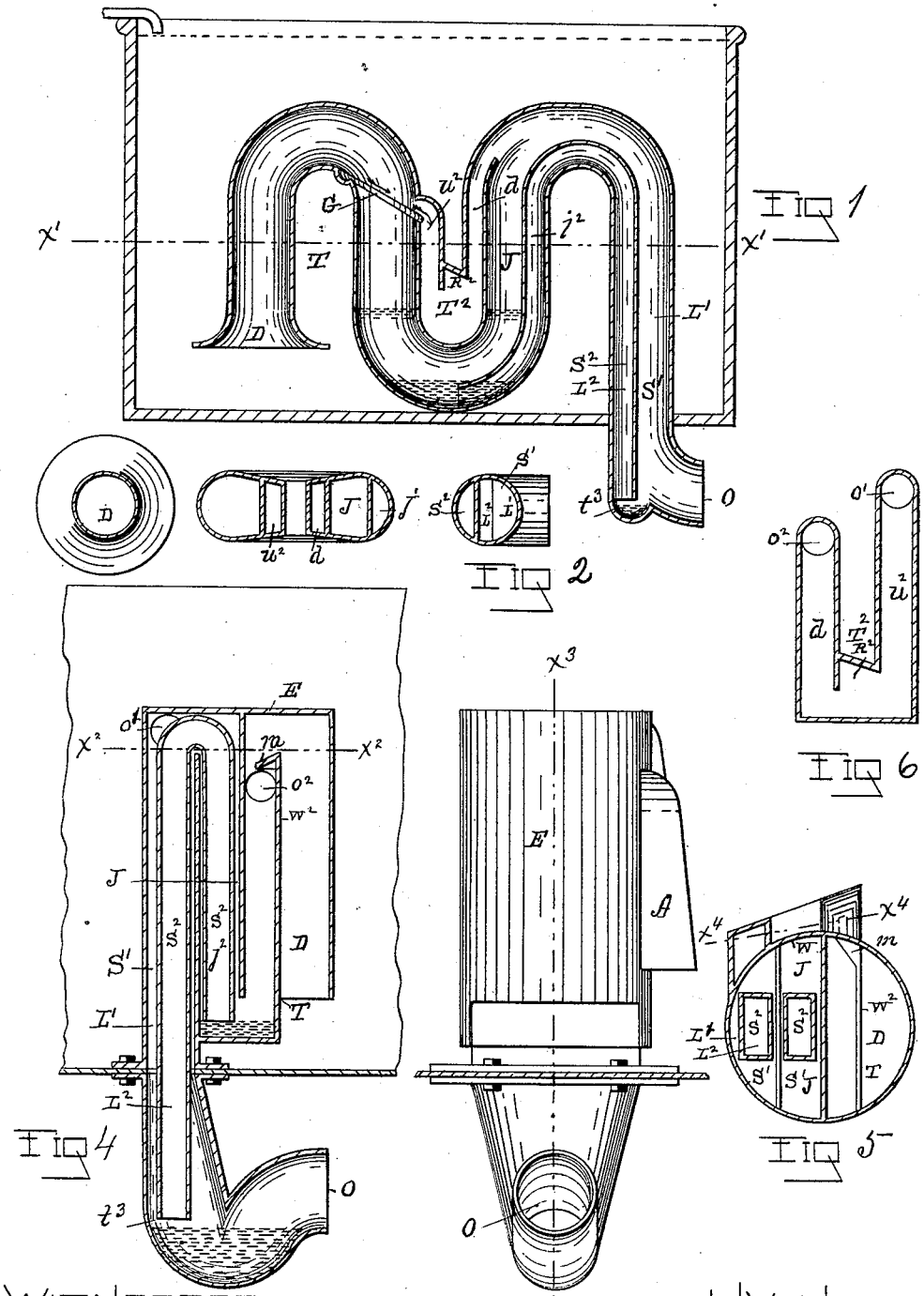
WITNESSES
William A. Sweet
Charles S. Brintnall
INVENTOR
Lew M Hawley
by W E Hagan atty

UNITED STATES PATENT OFFICE.

LEW M. HAWLEY, OF SCHENECTADY, NEW YORK.

TRAP AND SIPHON.

SPECIFICATION forming part of Letters Patent No. 475,396, dated May 24, 1892.

Application filed August 21, 1889. Serial No. 321,463. (No model.)

*To all whom it may concern:*

Be it known that I, LEW M. HAWLEY, of the city and county of Schenectady and State of New York, have invented new and useful Improvements in Traps and Siphons, of which the following is a specification.

My invention relates to traps and siphons as combined to be used in connection with tanks, cisterns, &c.; and the object and purpose of my invention is to combine in a novel manner with a primary or principal trap a secondary or accessory trap, and with a siphon constructed to be used in connection with the foregoing an accessory or secondary siphon, that is also provided with a trap to make the operation of this class of appliances more prompt and efficient in their action.

Accompanying this specification, to form a part of the same, there is a sheet of drawings containing six figures, illustrating the application of my invention, with the same designation of its parts by letter reference used in all of them.

In the drawings, Figure 1 is a longitudinal and central section of a combined trap and siphon containing my invention. Fig. 2 is a section taken on the line X' X' of Fig. 1. Fig. 3 is an elevation of a combined trap and siphon containing my invention, in which the parts are brought closer together so as to be within one inclosure, with the siphon-outlet shown as facing the view. Fig. 4 is a central vertical section taken on the line $x^3$ $x^3$ of Fig. 3. Fig. 5 is a transverse section taken on the line $x^2$ $x^2$ of Fig. 4, and Fig. 6 is a section taken on the line $x^4$ $x^4$ of Fig. 5. The parts illustrated at Figs. 3, 4, 5, and 6 show a modification so far as the arrangement of the parts is concerned.

The several parts of the apparatus thus illustrated are designated by letter reference, and the function of the parts is described as follows:

The letters T designate the primary or principal traps in each of the illustrations, and $T^2$ the secondary or accessory traps in all the figures.

The letters S' designate the primary or principal siphons in each of the figures, and $S^2$ the secondary or accessory siphons.

The letters $t^3$ designate the traps of the secondary or accessory siphons.

The letters O designate the discharge ends of the principal siphons, and $u^2$ the intake-legs of the secondary or accessory traps.

The letters D designate the downturned legs of the primary traps, and $d$ the uptake-legs of the secondary or accessory traps.

The letters L' designate the long legs of the principal siphons, and $l^2$ the long legs of the secondary or accessory siphons, and the letters J the uptake-legs of the principal siphons and $j^2$ the uptake-legs of the accessory or secondary siphons.

The letter G designates a groove that is recessed into so as to encircle the interior wall of the downturned leg of the principal traps, (shown at Fig. 1,) said groove being inclined from where starting in the lower surface of the bend between the uptake and downturned legs of the principal trap, and on its lower side this groove G enters the intake-leg of the secondary or accessory trap $T^2$, (shown at Fig. 1,) and the function of this groove is to direct the water that first rises in the uptake-leg of the principal trap to flow over the bottom of the bend into the accessory trap to fill the latter before filling the principal trap.

In the modification shown at Figs. 3, 4, 5, and 6 the primary or principal siphon and the accessory siphon are arranged within the same inclosure E, with the principal siphon surrounding the accessory siphon and with the accessory trap arranged in an offset made on the side thereof, (indicated at A,) there being made in the wall W of the offset containing the accessory trap openings $o'$ $o^2$, the latter of which openings connects the accessory trap with the downturned leg of the principal trap, and the opening $o'$ connects the uptake of the accessory trap with the long leg of the principal siphon.

The letter $m$ designates an angular shelf made in the upper edge of the interior wall $W^2$, dividing the uptake of the principal trap from the downturned leg of the latter, as shown at Figs. 4 and 5, and the function of this shelf $m$ is to direct the water rising in the uptake-leg of the principal trap to pass over the wall $W^2$ through the opening $o^2$ of the wall W to fill the accessory trap of the modification and so as to imprison within the recess $R^2$ made therein an air-bubble before filling the principal trap, in the same manner as does the groove G in the trap illustrated at Fig. 1. This recess $R^2$, made in the trap shown at Fig. 4, performs the same function as the recess shown at $R^2$ of Fig. 1.

The operation of the devices shown in all the figures is the same in principle and is as follows: With the water in the cistern below an operating level and with the cistern supplied with entering water, so as to raise the level thereof to enter the intake-leg of the trap, the water rises therein until it reaches the groove G of the apparatus shown at Fig. 1, or until it reaches the apertures $o^2$ of the apparatus shown at Figs. 4 and 6, when in either instance the water runs into so as to fill the accessory or secondary trap, and then overflows so as to fill the principal or primary trap below the bend between the downturned leg of the principal trap and the short leg of the siphon, so as to imprison the air between the uptake of the siphon and downturned legs of the trap. As the column pressure increases in the tank the imprisoned air is forced out in a measure over the wall which separates the accessory trap from the downturned leg of the principal trap through the accessory trap, (it offering less resistance than through the principal trap,) the water in the meantime rising in the principal trap and the uptake-leg of the siphon until it has reached the bottom surface of the bend between the short and long legs of the siphon. In the meantime the column pressure continuing to increase with the capacity of the recess $R^2$ to retain the air-bubble held therein remaining constant, the increasing pressure produced by the filling of the principal trap above the intake of the accessory trap releases the air-bubble held by the recess $R^2$ on that side of the latter offering the least resistance to its upward passage, said air-bubble passing up through the accessory trap followed by the water displacing it with upwardly-directed momentum that carries the water over the bend by the impulse thus created and starts the apparatus. Auxiliary to the starting of the principal siphon is the work of the accessory siphon, which being within the principal siphon with the top of the bend of the auxiliary siphon, where its uptake and downtake factors connect below the same parts of the principal siphon, as the water flows into the latter it passes over the bend of the accessory siphon at a lower level than in the principal siphon, and consequently the accessory siphon commences to act before the principal siphon and serves to start the latter, and the accessory siphon continues to act after the current in the principal siphon has been broken, the long legs of the auxiliary siphon terminating in the small traps $t^3$, and thus operate to empty the principal traps.

The air-recesses $R^2$ are only a part of my invention herein as combined to operate in connection with a combined trap and siphon in which the latter is constructed with an accessory siphon, the said recesses being made the subject of another application for Letters Patent made by me and known as Serial No. 303,600 and filed March 16, 1889, and in which the accessory siphon is used to fill the trap after the principal siphon has ceased to operate. In this application the accessory siphon is employed to aid in starting the principal siphon and to empty the trap after the action of the siphon proper has ceased.

Having thus described my invention, what I claim, and desire to secure by Letters Patent, is—

1. In a flushing apparatus, the combination, with a cistern or tank provided with an accessory trap, substantially as described, of a siphon arranged at the side of said trap and connected thereto within said tank and an accessory siphon arranged within said principal siphon, said accessory siphon having the top of the bend between its uptake and downtake legs at a lower level than the same parts of the principal siphon and provided with a trap in the downtake-leg of the principal siphon, substantially in the manner as and for the purposes set forth.

2. The combination, with a siphon having a connected trap and an interiorly-arranged accessory trap, substantially as described, of a conduit arranged within and upon the inner face of the outer wall of the principal trap and constructed to direct the water first passing over the division between the uptake and downtake legs of the principal trap into the accessory trap before filling the principal trap, substantially in the manner as and for the purposes set forth.

3. In a flushing apparatus, the combination of a trap having its uptake-leg arranged to take water from a tank or cistern, a siphon proper constructed to receive from said trap, an accessory trap arranged to be filled by the overflow from the uptake-leg of said trap proper before the latter is filled, with the discharge end of said accessory trap horizontally in a line with the lower surface of the bend between the long and short legs of the latter, substantially as and for the purposes set forth.

4. The combination, with a trap having an accessory trap made with an air-retaining area at the upper surface of the bend between the intake and uptake legs of the accessory trap, of a conduit made at the overflow between the uptake and downtake legs of the principal trap to direct the overflow into the accessory trap to fill the latter before filling the trap proper, substantially in the manner as and for the purposes set forth.

5. The combination, with the inclosure E, made with the offset A, of the trap proper T, the principal siphon S', and the accessory siphon $S^2$, arranged within said inclosure, substantially as described, and the accessory trap T², arranged within the said offset A and constructed to connect at O² with the down-take-leg of the trap proper and at O' with the top of the principal siphon, substantially in the manner as and for the purposes set forth.

Signed at the city of Troy, New York, this 27th day of April, 1889, and in the presence of the two witnesses whose names are hereto written.

LEW M. HAWLEY.

Witnesses:
CHARLES S. BRINTNALL,
W. E. HAGAN.